United States Patent Office 3,000,933
Patented Sept. 19, 1961

---

3,000,933
GEMINAL DINITROALKANOATES AND PROCESS OF MAKING SAME
Levonna Herzog, Mountain View, N.J., assignor to Aerojet-General Corporation, Azusa, Calif., a corporation of Ohio
No Drawing. Filed Apr. 11, 1957, Ser. No. 652,308
6 Claims. (Cl. 260—488)

This invention relates to new compositions of matter and methods for producing the same, and is related in particular to geminal dinitroalkanoate compositions having the general formula:

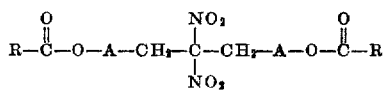

wherein R is a lower alkyl radical and A is a lower alkylene radical.

This application is a continuation-in-part of my copending application Serial No. 439,459, filed June 25, 1954, now abandoned, which was a continuation-in-part of application Serial No. 203,559, now abandoned, filed December 29, 1950, subsequently abandoned.

The diesters of this invention find valuable use as starting materials for the preparation of nitro alcohols, as disclosed in my copending application Serial No. 652,306, filed concurrently with the present application. The nitro alcohols obtained by the method of my said copending application react with nitro-substituted polyisocyanates such as methylene diisocyanate to form nitro polyurethanes, as disclosed in assignee's copending application Serial No. 328,515, filed December 29, 1952, now abandoned. The nitro polyurethanes thus obtained are useful as high energy solid rocket propellants which can be utilized as a primary propulsion source in rocket-propelled vehicles, and can also be used as a propellant for artillery missiles. When used as the primary propulsion source for rocket vehicles, they can be conveniently ignited by a conventional igniter, as for example the igniter disclosed in assignee's copending patent application Serial No. 306,030, filed August 23, 1952. The propellant is preferably cast in tubular form and restricted in the conventional manner with a relatively inert resin, such as a non-nitrated polyurethane foam or a polyester resin, and placed inside a chamber having one end open and leading into a conventional venturi rocket nozzle. Upon ignition, large quantities of gases are produced and exhausted through the nozzle creating propulsive force.

The diesters of this invention are conveniently prepared by the reaction of a corresponding dihalogen compound and an alkanoic acid in the presence of a silver alkanoate in accordance with the general reaction scheme set forth below:

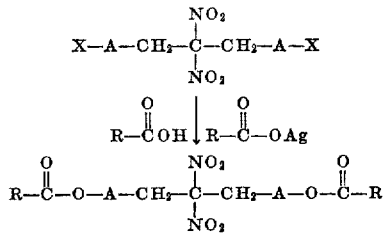

wherein X is a bromine or chlorine, A is a lower alkylene radical and R is a lower alkyl radical.

The reaction temperature is non-critical in the reaction of this invention, the only effect of temperature variation being a corresponding increase or decrease in the reaction rate. Similarly, time is a non-critical variable in the reaction, the time required varying with the reaction rate which in turn depends on the temperature.

To more clearly illustrate my invention, the following example is presented. This example is intended merely as a means of illustration and should not be construed as limiting the invention to the particular conditions set forth therein.

EXAMPLE I

*Preparation of 3,3-dinitro-1,5-diacetoxypentane*

An amount of 3,3-dinitro-1,5-pentane dibromide equal to 260 gm. (.813 mole) was placed in a flask fitted with a sealed mercury stirrer and a condenser having a calcium chloride drying tube connected thereto. Glacial acetic acid was added to the flask in an amount equal to 2500 ml., along with 390 gm. (2.34 moles) of silver acetate. The mixture was heated and refluxed while stirring for a period of twenty hours. At the end of this period, the mixture was diluted with ether $(C_2H_5)_2O$ and filtered. The filtrate was evaporated under reduced pressure to remove the majority of the acetic acid. The residue was taken up again in ether and washed with an aqueous sodium carbonate solution and subsequently with an aqueous sodium carbonate solution until neutral. The ether solution was treated with decolorizing charcoal, filtered, the ether evaporated and the residue purified by crystallization from ethanol at $-15$ to $-20°$ C. This yielded 161 gm. (71.2%) of impure 3,3-dinitro-1,5-diacetoxy pentane. After two more recrystallizations from ethanol, colorless crystals of 3,3-dinitro-1,5-diacetoxypentane were formed which had a melting point of 33.5 to 34.5° C. This compound having the formula $C_9H_{14}O_8N_2$, had a calculated composition of:

Percent C, 38.25; percent H, 5.07; percent N, 10.07 the percentages being by weight.

An ultimate analysis of the compound gave the following results:

Percent C, 39.24; percent H, 5.12; percent N, 10.29 the percentages being by weight.

The dihalogen compounds used as starting materials are obtained from the reaction of bromine or chlorine upon a silver geminal dinitroalkanoate, as disclosed in my copending application Serial No. 652,307, filed concurrently with the present application.

The alkanoic acid used in the practice of this invention may be any lower alkanoic acid such as formic, acetic, propionic, etc.

From the foregoing discussion, it will be readily apparent that a wide variety of diesters, such as methyl, ethyl, propyl, etc., 3,3-dinitro-1,5-pentanedioate, 3,3-dinitro-1,6-hexanedioate, 4,4-dinitro-1,7-heptanedioate, and various other higher homologues of these esters can be prepared by proceeding in accordance with the preceding disclosure.

I claim:
1. As compositions of matter, the geminal dinitro compounds having the formula:

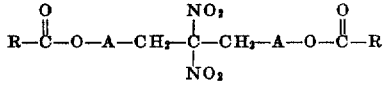

wherein R is a lower alkyl radical and A is a lower alkylene radical.

2. As compositions of matter, the geminal dinitro compounds having the formula:

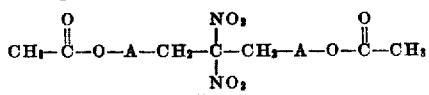

wherein A is a lower alkylene radical.

3. As a composition of matter, 3,3-dinitro-1,5-diacetoxypentane having the structural formula:

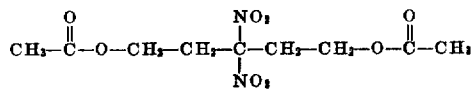

4. The method of preparing geminal dinitro compounds having the formula:

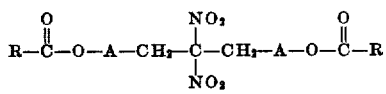

which comprises reacting a halogen substituted nitro compound having the formula:

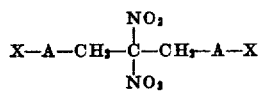

with a lower alkanoic acid in the presence of a silver salt of a lower alkanoic acid; wherein R is a lower alkyl radical, A is a lower alkylene radical and X is a halogen radical selected from the group consisting of chlorine and bromine.

5. The method of preparing a nitro compound having the formula:

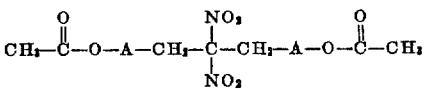

which comprises reacting a halogen substituted nitro compound having the formula:

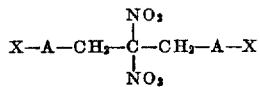

with acetic acid in the presence of silver acetate wherein A is a lower alkylene radical and X is a halogen radical selected from the group consisting of chlorine and bromine.

6. The method of preparing 3,3-dinitro-1,5-diacetoxypentane which comprises reacting 3,3-dinitro-1,5-pentane dibromide with acetic acid in the presence of silver acetate.

References Cited in the file of this patent

UNITED STATES PATENTS

| | | |
|---|---|---|
| 2,340,268 | Hass | Jan. 25, 1944 |
| 2,402,776 | Robinette | June 24, 1946 |
| 2,522,959 | Plaut | Sept. 19, 1950 |

OTHER REFERENCES

Feuer et al.: J. Am. Chem. Soc., 73, 1360 (1951).
Feuer et al.: J. Am. Chem. Soc., 77, 5740 (1955).